Mar. 27, 1923.
A. O. HIGINBOTHAM
FLUID PRESSURE CONTROLLED MECHANISM
Filed Nov. 5, 1919
1,449,819
3 sheets-sheet 2
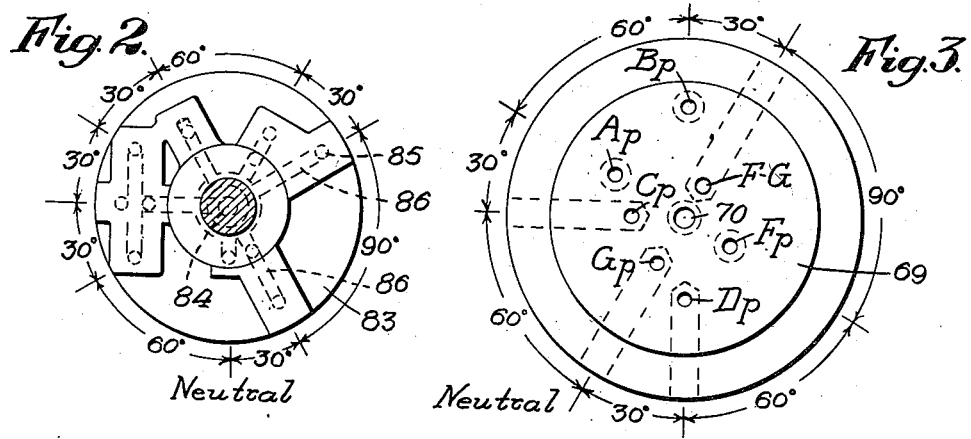
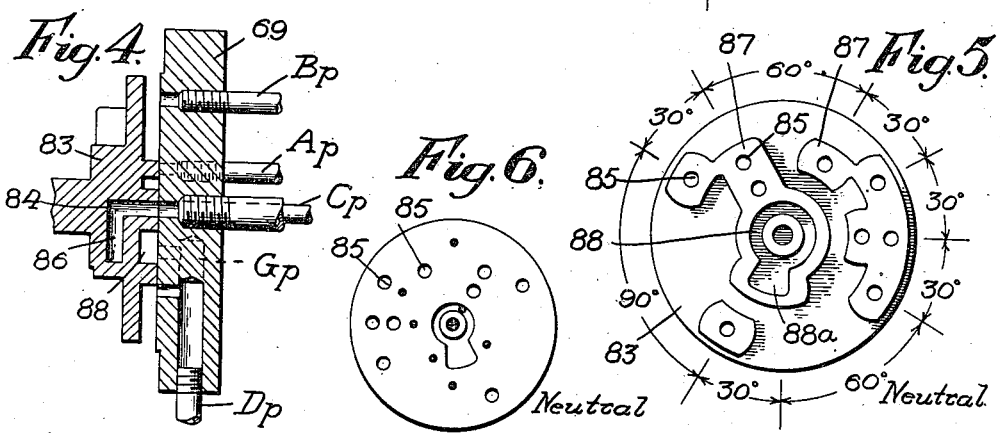
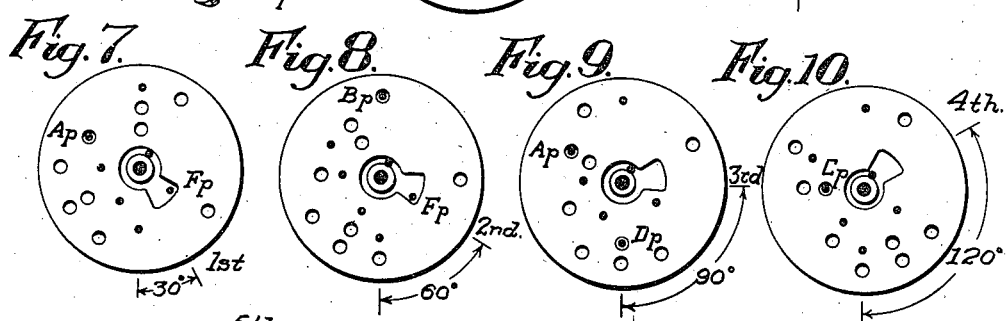
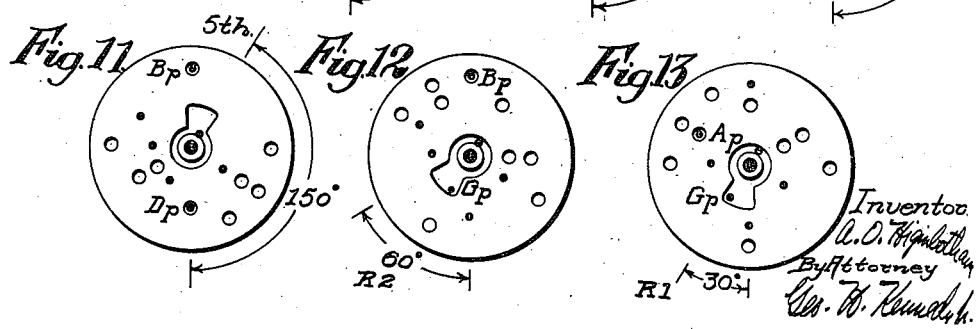

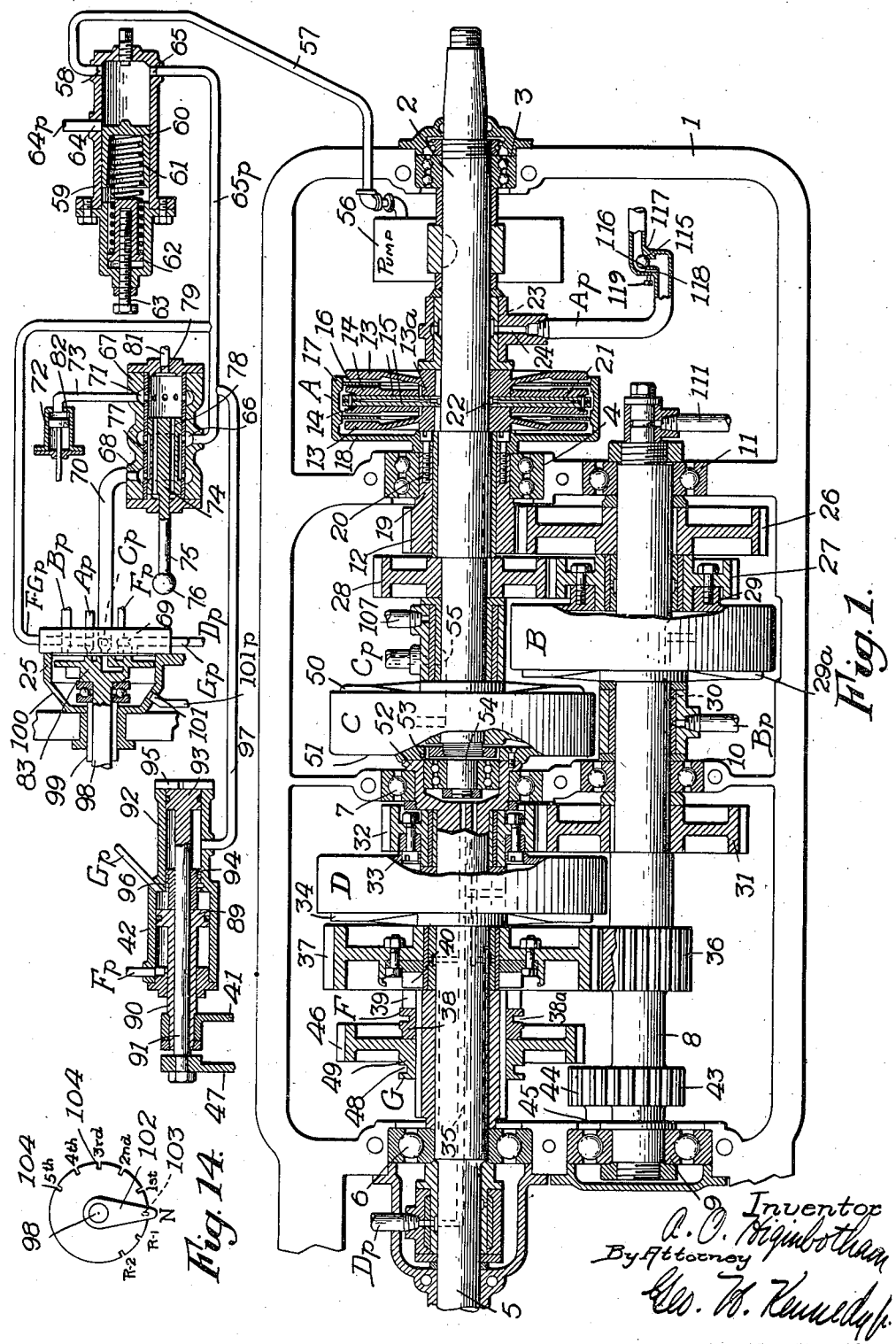

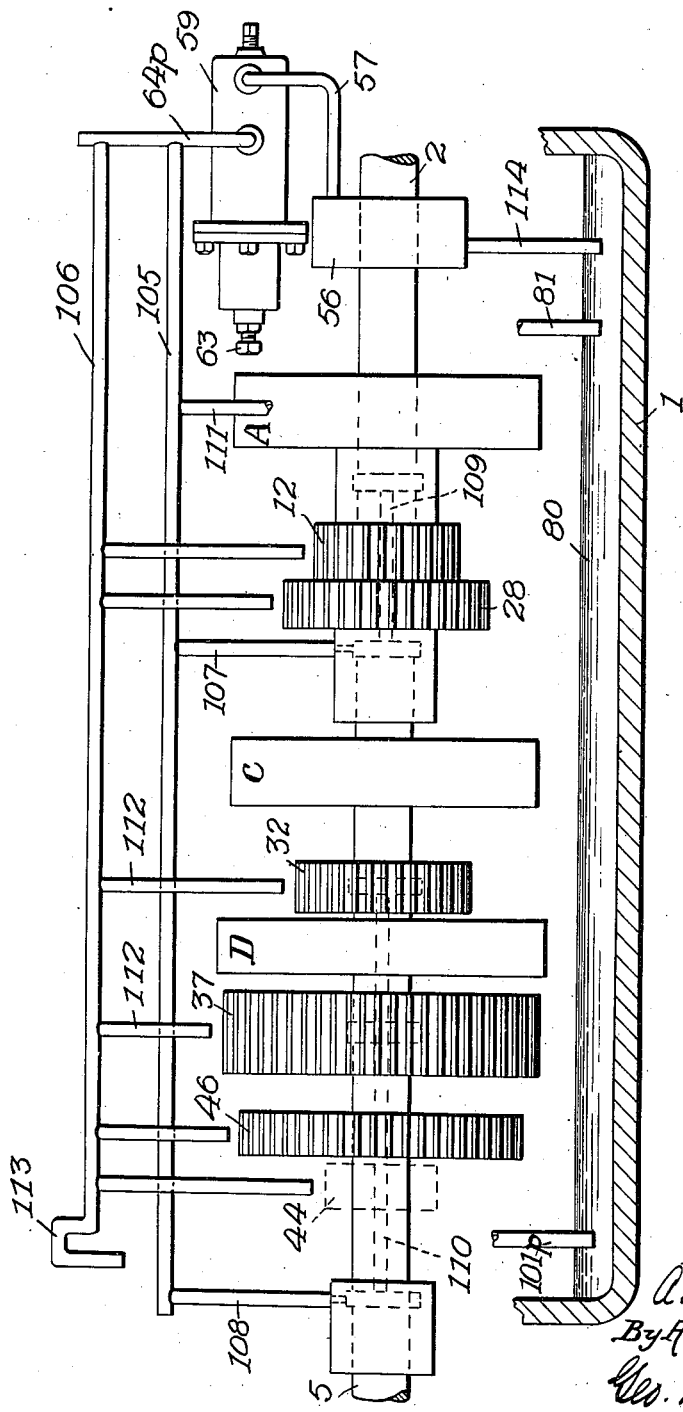

Patented Mar. 27, 1923.

1,449,819

UNITED STATES PATENT OFFICE.

ARTHUR O. HIGINBOTHAM, OF WORCESTER, MASSACHUSETTS, ASSIGNOR, BY MESNE ASSIGNMENTS, TO THE G. F. H. CORPORATION, OF DENVER, COLORADO, A CORPORATION OF MASSACHUSETTS.

FLUID-PRESSURE-CONTROLLED MECHANISM.

Application filed November 5, 1919. Serial No. 335,825.

*To all whom it may concern:*

Be it known that I, ARTHUR O. HIGINBOTHAM, a citizen of the United States, residing at Worcester, in the county of Worcester and Commonwealth of Massachusetts, have invented a new and useful Improvement in a Fluid-Pressure-Controlled Transmission, of which the following, together with the accompanying drawings, is a specification.

My invention relates to power transmission mechanism for motor vehicles, and it has for its object to provide a fluid pressure controlled transmission by means of which the operation of a motor vehicle may be readily controlled with a wide range of driving speeds.

In the operation of motor vehicles, it is particularly desirable to be able to drive through a wide range of speeds, and to be able to make speed changes practically instantaneously. It is generally recognized that considerable skill is required on the part of a driver to be able to make such speed changes quickly without clashing of gears in the transmission, and otherwise straining the driving mechanism, particularly with a heavy motor vehicle, on account of the inertia of the rotating parts and the momentum of the vehicle.

By my invention, I propose to provide a fluid pressure controlled transmission for motor vehicles by means of which all of the gear shifting necessary to drive the vehicle through a wide range of speed and to reverse its direction of movement is automatically performed. In this way, the most difficult part of the operation of a heavy motor vehicle is rendered entirely independent of the skill of the driver, for all that the driver has to do, in addition to steering and braking, is to move the handle of a suitable selecting valve in order to obtain the desired changes in speed or in the direction of movement.

In the accompanying drawings,

Figure 1 is a longitudinal sectional view of a transmission mechanism embodying my invention, together with its associated automatic fluid pressure controlled apparatus.

Figure 2 is a plan view of the movable member of the selecting valve.

Figure 3 is a plan view of the stationary member of the selecting valve.

Figure 4 is a transverse sectional view of the members shown in Figs. 2 and 3.

Figure 5 is a plan view of the movable member showing the side opposite to that shown in Fig. 2.

Figures 6 to 13, inclusive, are diagrammatic views showing the relative positions occupied by the members of the selecting valve for different positions of the operating handle.

Figure 14 is a plan view of the operating handle of the selecting valve.

Figure 15 is a diagrammatic view of the lubricating system employed in connection with my invention.

Similar reference characters refer to similar parts in the different figures.

Referring to Fig. 1, the transmission mechanism is inclosed in a casing 1 within which a driving shaft 2 is rotatably supported in bearings 3 and 4. The shaft 2 is adapted to be permanently connected to the crank shaft of the motor, not shown. A driven or tail shaft 5 is rotatably supported in coaxial relation with the driving shaft 2 by means of bearings 6 and 7. The shaft 5 is suitably coupled to the propeller shaft of the vehicle. A countershaft 8 is rotatably supported parallel to the shafts 2 and 5 in bearings 9, 10 and 11.

A pinion 12 is loosely mounted on the shaft 2 and is adapted to be driven therewith by means of a fluid pressure clutch A. The clutch A comprises a pair of annular disks 13 keyed on the shaft 2 and a pair of annular plates 14 keyed for longitudinal movement on the reduced hub portions 13$^a$ of the disks 13. Oppositely disposed flexible members 15 surround the shaft 2 between the hub portions 13$^a$ of the disks 13, and are adapted to rotate therewith. A pair of longitudinally movable rings 16 are located between the respective pairs of driving disks 13 and plates 14. The rings 16 are supported from the inner periphery of an annular rim 17 of a spider 18 that is loosely mounted on the shaft 2. The spider 18 is secured to the hub 19 of the pinion 12 by suitable means, such as bolts 20. The space 21 between the flexible members 15 communicates with a longitudinal slot 23 provided on the shaft 2 through an opening 22. A radial passage 24 is provided at one end of the slot 23 within which is secured a pipe $A^p$ which is connected to suitable pressure means through a selecting valve 25 which will be hereinafter described. When the pipe $A^p$ is connected to the pressure means, the flexible members 15 are moved apart which causes the rings 16 to be clamped against the disks 13 by the outward longitudinal movement of the plates 14. When this occurs, the pinion 12 will be driven with the shaft 2, through the spider 18. Springs are provided to separate the plates 14 from the disks 13 as soon as the pressure is released. The above described fluid pressure clutch A forms no part of my present invention but is fully shown and described in my copending application Serial No. 147.701, filed February 9, 1917. Any other suitable fluid pressure clutch may be employed.

A gear 26 keyed on the countershaft 8, is constantly in mesh with the pinion 12. A gear 27 mounted loosely on the countershaft 8 adjacent to the gear 26 is constantly in mesh with a gear 28 keyed on the shaft 2 adjacent to the pinion 12. The gear 27 is mounted on the spider 29 of a fluid pressure clutch B similar in construction and operation to the previously described clutch A. The clutching disks $29^a$ of the clutch B are keyed on the countershaft 8. A pipe $B^p$ communicates with a longitudinal slot 30 in the countershaft 8 which in turn communicates with the space between the flexible members of the clutch B, so that the gear 27 will be clutched to the countershaft 8 by the application of pressure means. A gear 31 keyed on the countershaft 8 is constantly in mesh with a pinion 32 loosely mounted on the tail shaft 5. The pinion 32 is connected to the spider 33 of a fluid pressure clutch D, the clutching disks 34 of which are keyed on the tail shaft 5. A pipe $D^p$ communicates with a longitudinal slot 35 provided in the tail shaft 5 which in turn communicates with the space between the flexible members of the clutch D, so that the pinion 32 will be driven with the tail shaft 5 when pressure means is applied to the clutch D.

A gear 36 is mounted on the countershaft 8 and is in constant engagement with a gear 37 loosely mounted on the tail shaft 5. The gear 37 is adapted to be driven with the tail shaft 5 by means of a dog-clutch F. The dog-clutch F comprises a hub 38 keyed on the tail shaft 5 but adapted for longitudinal movement thereon and provided with a plurality of spaced dogs 39. The gear 37 is provided with a plurality of dogs 40 similarly spaced to the dogs 39. The dogs 39 and 40 are adapted to be moved into engagement with each other by means of a shifting arm 41 that is adapted to engage a groove $38^a$ provided on the hub 38 of the clutch F. The movement of the shifting arm 41 is controlled by a cylinder 42, which will be hereinafter described.

The countershaft 8 is further provided with a pinion 43 which is constantly in mesh with an idler pinion 44 mounted on a stud 45 that is supported from one end of the casing 1. A gear 46 is keyed for longitudinal movement on the tail shaft 5 and is adapted to be moved into and out of engagement with the idler pinion 44 by means of a shifting arm 47 which engages a groove 48 provided on the hub 49 of the gear 46. The movement of the shifting arm 47 is also controlled by the cylinder 42.

The clutching disks 50 of a fluid pressure clutch C are mounted on the left hand end of the shaft 2 and the relatively movable spider 51 of the clutch C is mounted on the right hand end of the tail shaft 5. The shaft 5 is provided at its end with an annular enlarged portion 52 within which is located a bearing 53 for rotatably supporting the reduced end portion 54 of the shaft 2. A pipe $C^p$ communicates with a longitudinal groove 55 in the shaft 2 which in turn communicates with the space between the flexible members of the clutch C, so that when the pipe $C^p$ is connected to a source of pressure, the shafts 2 and 5 are clutched together and a direct driving connection is established between the engine and the propeller shaft of the motor vehicle.

A pump 56 of any suitable design is driven from the shaft 2 and is provided with an outlet pipe 57 which is connected to the inlet port 58 of a pressure controlling cylinder 59. A piston 60 is adapted to move within the cylinder 59 and is normally maintained toward the right hand end of its stroke by a spring 61, the pressure of which may be adjusted by means of a plunger 62 and an adjusting screw 63. As soon as the pressure in the cylinder 58 reaches a predetermined amount fixed by the adjusting screw 63, the piston 60 moves to the left to allow the fluid within the cylinder to pass out through the port 64. The port 64 is connected to the lubricating system through a pipe $64^p$, as will be hereinafter described with reference to Fig. 15. The farther end of pipe $64^p$ is open to atmospheric pressure so that substantially no back pressure can build up therein.

A pipe $65^p$ is connected to the outlet port 65 of the cylinder 59 and leads directly to the inlet port 66 of a main control valve cylinder 67. The cylinder 67 is provided with an annular port 68 which is connected to the stationary member 69 of the selecting valve 25 through a pipe 70. The cylinder 67 is further provided with a port 71 which is connected to a brake cylinder 72 through a pipe 73. A piston 74 within the cylinder 67 is provided with an extending rod 75 which terminates in an operating portion 76 by means of which the piston 74 may be moved within the cylinder 67. With the piston 74 in its left hand position, as shown, the port 66 is connected to the port 68 through a longitudinal passage 77 provided on the outer periphery of the piston 74 and fluid under pressure is then free to pass from the pump 56 to the selecting valve 25 through the pressure control cylinder 59. When the piston 74 is moved to the middle position of its stroke the port 68 is cut off from the admission port 66 and is open to atmospheric pressure through longitudinal passages 78 in the piston 74 and the exhaust port 79 at the end of the cylinder 67 which is preferably connected to the oil sump 80 in casing 1 through a pipe 81, as shown in Fig. 15. When the piston 74 is moved to the right hand end of its stroke, the port 71 is connected to the port 66 through passage 77, whereupon fluid under pressure is delivered to the brake cylinder 72 and the brakes are applied by the movement of the piston 82 therein. When the port 71 opens, the pressure in the system is augmented by the movement of piston 60 in cylinder 59 which displaces enough fluid to fill the brake cylinder 72 with substantially no decrease in pressure.

While the piston rod 75 is here shown as being provided at its end with an operating portion 76 by means of which the piston 74 may be moved in the cylinder 67, it is to be understood that the rod 75 may also be connected to any well known form of brake pedal, through suitable levers for transmitting the motion of the brake pedal to the rod 75.

Referring to Figs. 2 to 5 inclusive, the stationary member 69 of the selecting valve 25 comprises an annular disk which is provided with a plurality of openings and radial passages for receiving the ends of the pipes A$^p$, B$^p$, and so forth, the other end of the pipes being connected, as shown in Fig. 1. The openings in the stationary member 69 will hereinafter be referred to as A$^p$, B$^p$, etc., in order to avoid confusion. The movable member 83 of the selecting valve 25 is provided with a central opening 84 that always registers with the central pipe opening 70 in the stationary member 69. The central opening 84 connects with a plurality of ports 85 through radial passages 86, as best shown in Fig. 2. The under side of the valve member 83 opposite to the face of the member 69 is provided with a plurality of projections 87 which are in contact with the face of the member 69. The ports 85 extend through the projections 87 and are adapted to register with the openings A$^p$, B$^p$, etc., in the member 69 for different positions of the movable member 83 with respect to the stationary member 69.

The member 83 is further provided with an annular groove 88 which is extended as shown at 88$^a$ and always registers with the opening FG. The pipe FG$^p$ is connected to the fluid supply at a point between the inlet port 66 of the cylinder 67 and the pump 56. Pipes F$^p$ and G$^p$ extend from the stationary valve member 69 to opposite ends of the cylinder 42, previously referred to. A piston 89 comprises a sleeve portion 90 which is adapted to slide upon a rod 91 centrally located within the cylinder 42. The shifting arm 41 is mounted upon the end of the sleeve 90 which projects outside of the cylinder 42 and the shifting arm 47 is mounted upon the projecting end of the rod 91. The cylinder 42 is extended at one end to provide an auxiliary cylinder 92 of smaller diameter than the cylinder 42. Auxiliary pistons 93 and 94 are respectively mounted upon the rod 91 within the auxiliary cylinder 92, the piston 94 being free to slide upon the rod 91. The cylinder 92 is provided with a plate 95 to limit the piston 93 and a stop 96 for limiting the movement of the piston 94. A pipe 97 connects the auxiliary cylinder 92 to the fluid supply between the cylinder 67 and the pump 56, so that fluid under pressure is constantly supplied to the auxiliary cylinder 92 so long as pressure exists in the system. With the auxiliary cylinder 92 filled with fluid under pressure, the pistons 94 and 93 are respectively held at the ends of the cylinder 92 and tend to maintain the shifting arms 41 and 47 in their neutral position, as illustrated in Fig. 1. In this position the piston 94 is in engagement with the piston 89 and its stop 96, and the piston 93 is in engagement with plate 95. While the cylinder 92 is preferably connected to the fluid supply, a spring might also be employed to act on the pistons 93 and 94.

Referring now to Figs. 1 and 14, the movable member 83 of the valve 25 is provided with a spindle 98 that is rotatably supported in a bearing 99 carried by the casing 100 surrounding the member 83. The casing 100 is provided with an exhaust port 101 which is maintained at atmospheric pressure, preferably through a pipe 101$^p$ connected to the oil sump 80. The valve spindle 98 is extended to a point adjacent to the steering column of the vehicle, and as best shown in Fig. 14, is provided at its upper end with a handle 102. The handle 102 is provided with a projection 103 on its under side which is adapted to pass over the face of a dial and register in notches 104, the notches being marked for a neutral position, five forward speeds and two reverse speeds, as indicated.

Referring now to Figs. 6 to 13, inclusive, there is shown diagrammatically the relative positions of the members of the selecting valve corresponding to the positions occupied by the handle 102 when in engagement with the different notches 104 on the dial. The circles represent the ports 85 in the movable valve member 83, and the black dots represent the openings for the various pipes $A^p$, $B^p$, etc., which lead into the stationary valve member 69. It is obvious that as the valve member 83 moves with respect to the valve member 69, that certain of the valve ports 85 will register with certain of the pipe openings in the member 69. The various positions of the valve are represented separately in Figs. 6 to 13 inclusive, each figure representing the position of the valve for the corresponding marking on the dial.

Referring to Fig. 15, the pipe $64^p$ from the outlet port 64 of cylinder 59 is connected to distributing pipes 105 and 106 which extend longitudinally above the shafts 2 and 5. The pipe 105 is provided with outlets 107 and 108 which communicate with passages 109 and 110 provided in the shafts 2 and 5, respectively. The passage 109 provides lubricating fluid to the clutch A and the loose gear 12, and the passage 110 provides fluid to the clutch D and the loose gears 32 and 37. A third outlet 111 provides lubricating fluid to the countershaft 8. The pipe 106 is provided with outlets 112 for discharging lubricating fluid above the several sets of gears in the transmission casing 1. The pipe 106 is provided with an elbow 113 which discharges into the sump 80 at the bottom of casing 1.

The pump draws lubricating fluid from the sump 80 through an inlet pipe 114 and delivers it to the pressure controlling cylinder 59. As soon as the pressure builds up therein to a predetermined point the port 64 opens and fluid is delivered to the pipes 105 and 106 from whence it is distributed through the outlets. The fact that the elbow 113 is above the outlets insures that fluid will first be delivered to the outlets 107, 108 and 111, and then to the outlets 112, after which the surplus fluid will be discharged into the sump 80 at atmospheric pressure. In this way, substantially no back pressure can build up in the pipe $64^p$, as the outlets are all of ample cross section.

The pipes $A^p$, $B^p$, and $C^p$ are respectively provided with a check valve, as shown in Fig. 1, which comprises a ball 115 normally resting in a seat 116 provided in an enlarged portion 117 of the pipe. A passage 118 of considerably smaller cross section than the pipe provides a by-pass around the ball. When either pipe $A^p$ or $B^p$ is connected to the source of fluid pressure, the ball 115 is seated and the fluid is forced to go through the passage 118 in order to reach the clutch A or B. When the pressure is released, the ball 115 readily unseats to allow free passage of the fluid through the pipe. Suitable adjusting means, such as a screw 119, are provided to regulate the cross section of opening 118.

Having described the various parts entering into my invention, the operation thereof is as follows: With the selecting valve handle 102 in the "neutral" position, the members of the selecting valve occupy the position shown in Fig. 6. In this position, none of the ports 85 register with the pipes of the stationary member and consequently no fluid from the pipes 70 and $FG^p$ enters the pipes $A^p$, $B^p$, etc. The pistons 93 and 94 in the auxiliary cylinder 92 are at opposite ends thereof and maintain the shifting arms 41 and 47 in the neutral position.

When the selecting valve handle 102 is turned to the position of "First speed", the position of the valve is as shown in Fig. 7, in which the pipes $A^p$ and $F^p$ are connected to the source of fluid pressure. The fluid in pipe $A^p$ is retarded by the seating of ball 115, so that the piston 89 of cylinder 42 is first moved to the right against the piston 94 and the engagement of the dogs 39 and 40 clutches the gear 37 to the tail shaft 5. The clutch A then operates to clutch pinion 12 to shaft 2. The drive is then from shaft 2 to countershaft 8 through the pinion 12 and the gear 26, and from the countershaft 8 to the tail shaft 5 through pinion 36 and gear 37, with a substantial reduction in the speed of shaft 5, with respect to shaft 2.

If it is desired to release the driving connection with the gears still remaining in "First speed", it is only necessary to move the main control valve piston 74 to its middle position, whereupon the pressure in pipe $A^p$ will be released through the exhaust port 79. The clutch A will then be released, but the dog clutch F will still remain in engagement owing to the fact that the pipe $FG^p$ and groove 88 are connected to the source of fluid pressure beyond the control valve cylinder 67. The driving connection will be reestablished through the clutch A as soon as the valve 67 is moved to the left. If it is desired to apply the brakes, the operating portion 76 is moved to the right until the piston 74 admits fluid to the port 71 and the brakes will be immediately applied through the movement of the piston 82 in the brake cylinder 72. When the desired braking effect has been obtained, the piston 74 is moved enough to cut off port 71 from the pressure, but without relieving the same. The pressure on the brakes can then be held or be varied by moving the piston 74 back and forth.

When the handle 102 is moved to "Second speed" the pressure in pipe A$^p$ is released through the exhaust port 101 and pressure is applied to the pipe B$^p$. Clutch A is thereupon released and clutch B actuated, and as the pipe F$^p$ remains under pressure the dog clutch F remains in engagement as in "First speed". The drive is then from shaft 2 to countershaft 8 through gears 28 and 27, and from countershaft 8 to the tail shaft 5 through pinion 36 and gear 37, as before. This gives a speed reduction somewhat less than in first speed, owing to the fact that there is substantially no reduction between gears 27 and 28.

When the handle 102 is moved to "Third speed" the pipes B$^p$ and F$^p$ are released and pressure is applied to pipes A$^p$ and D$^p$. The pressure clutch B is thereupon released and as the piston 89 of cylinder 42 is moved to its neutral position by the piston 94, the shifting arm 41 disengages the dog clutch F. With pressure clutches A and D energized, the drive is from shaft 2 to countershaft 8 through the pinion 12 and the gear 26, and from countershaft 8 to the tail shaft 5 through the gears 31 and the pinion 32. This gives an increase in the speed of the vehicle owing to the stepping up of the tail shaft speed with respect to the countershaft 8 through the gear 31 and pinion 32.

When the handle 102 is moved to "Fourth speed" the pressure clutches A and D are released following the opening of the pipes A$^p$ and D$^p$ to exhaust. As shown in Fig. 10, only the pipe C$^p$ is now open to pressure which actuates the clutch C to establish a direct driving connection between the shaft 2 and the tail shaft 5. The propeller shaft of the vehicle is then driven at engine speed.

When the handle 102 is moved to "Fifth speed," the clutch C is released and the clutches B and D are actuated through the opening of pipes B$^p$ and D$^p$ to the fluid pressure, as shown in Fig. 11. With the clutches B and D energized, the drive is from shaft 2 to the countershaft 8 through the gears 27 and 28, and from countershaft 8 to the tail shaft 5 through gear 31 and pinion 32. This results in a speed greater than the speed of shaft 2 owing to the stepping up of the tail shaft speed through the gear 31 and the pinion 32.

When it is desired to reverse the direction of movement of the vehicle, the handle 102 is moved to "First reverse." When this occurs, the admission of pressure to the pipe G$^p$ causes the piston 89 to be moved to the left against piston 93, whereupon the shifting arm 47 moves the gear 46 into engagement with the idler pinion 44. The clutch A is then energized through the opening of the pipe A$^p$ to pressure. The drive is then from shaft 2 to the countershaft 8 through the pinion 12 and gear 26, and from the countershaft 8 to the tail shaft 5 through the pinions 43, 44, and the gear 46. The introduction of the idler pinion 44 reverses the direction of rotation of shaft 5 with respect to shaft 2.

When the handle 102 is moved to "Second reverse," the clutch A is released through the release of pressure in the pipe A$^p$, but pipe G$^p$ still is open to fluid pressure. The clutch B is actuated through pipe B$^p$ and gear 46 remains in mesh with the idler pinion 44 as in "First reverse." The drive is then from the shaft 2 to the countershaft 8 through gears 28 and 27 and from countershaft 8 to tail shaft 5 through the pinions 43 and 44, and the gear 46.

If it is desired to relieve the driving connection while the handle is either in "First reverse" or "Second reverse," either the clutch A or the clutch B may be released while the gear 46 remains constantly in mesh with the idler pinion 44, owing to the fact that the pipe FG$^p$ and groove 88 constantly supply fluid under pressure to the selecting valve regardless of the position of the main control valve cylinder 67.

From the foregoing it is apparent that a large and heavy motor vehicle equipped with a transmission embodying my invention, can be easily operated with a wide range of speeds without any possibility of difficulties arising from unskillful operation on the part of the driver. The only qualifications required of the driver, in addition to the ordinary judgment necessary for proper steering and speed control, is the slight ability required to manipulate the handle 102 of the selecting valve. With this selecting valve, it is impossible to change the gear ratio without first automatically releasing the driving power on the gears already in operation. The main control valve is also so arranged that the driving connection between the shaft 2 and tail shaft 5 is automatically released before the brakes can be applied by the operation of the brake cylinder.

The arrangement by which certain ports of the selecting valve are continuously connected to the source of fluid pressure, independently of the control valve, enables clutches on the tail shaft 5 to be held in while releasing the friction clutches on the other shafts.

The cylinder 59 serves as a pressure accumulator for the system; whenever fluid is admitted to one of the pressure operated devices, the spring pressed piston 60 tends to maintain the pressure of the system by displacing fluid therein which insures quick operation of the devices. The piston is returned to its normal position with the lubricating port 64 open, as soon as the system is filled at the predetermined pressure following the operation of the devices. In other words, energy is stored in the system prior to the operation of the fluid pressure devices and returned thereto upon the operation of the same.

My invention further provides a power transmission that is capable of producing a relatively high number of speed changes, both forward and reverse, with a comparatively small number of simple gear ratios. I am aware that various arrangements of planetary gearing have heretofore been employed for producing a large number of speed changes, but in my transmission a countershaft having a fixed axis of rotation is employed for transmitting the power between the driving shaft and the driven shaft. This countershaft is adapted to receive a plurality of different speeds in a given direction of rotation, from the driving shaft and is adapted to transmit a plurality of different speeds to the driven shaft. The total number of speeds obtainable, in a given direction of rotation, will always be equal to, or more than the number of gear ratios employed. Thus, two gear ratios between the countershaft and each of the main shafts gives four forward speeds, and it is obvious that this total could be increased to nine by the employment of only three gear ratios between the countershaft and each of the other shafts.

While I have shown my invention as being carried out by the use of a specific type of power transmission and fluid pressure clutch, and as being controlled by the use of specific forms of valve, nevertheless it is apparent that other types of power transmission, fluid pressure clutches, and valves, may be as readily employed to accomplish the same result without departing from the spirit and scope of my invention, and I desire therefore that only such limitation shall be imposed thereon as come within the scope of the appended claims.

I claim:

1. In a power transmission, the combination with a driving shaft and a countershaft, a driven shaft in alinement with said driving shaft, and gears constantly in mesh interposed between the shafts, of fluid pressure controlled devices for clutching certain of said gears to each of said shafts and establishing a driving connection therebetween, and means for preventing the clutching of a gear to the driving shaft before a gear has been clutched to the driven shaft.

2. In a power transmission, the combination with a driving shaft, a countershaft, a driven shaft, and gears constantly in mesh interposed between the shafts, of fluid pressure controlled devices for clutching certain of said gears to each of said shafts, and a control valve for simultaneously operating selected pairs of said devices to establish driving connections between said shafts with different speed ratios therebetween.

3. In a power transmission mechanism the combination with fluid pressure clutching devices and a source of fluid pressure, of a control valve for simultaneously connecting any selected pair of a plurality of said devices to the pressure source at the same time.

4. In a power transmission mechanism, the combination with fluid pressure clutching devices and a source of fluid pressure, of a selecting valve for operating said devices, certain of the ports of said selecting valve being connected directly to the pressure source, and a pressure releasing valve connected between said pressure source and the other ports of said selecting valve.

5. In a power transmission mechanism, the combination with a plurality of shafts, a plurality of sets of intermeshing gears mounted on said shafts, fluid pressure clutching devices for connecting one gear of each of said sets to one of said shafts, and a source of fluid pressure, of a selecting valve for connectiong said devices to said source, and means for releasing the pressure in certain of said devices while the pressure remains in other of said devices through said valve.

6. In a power transmission mechanism, the combination with a plurality of shafts, a plurality of sets of intermeshing gears mounted on said shafts, fluid pressure clutching devices for connecting one gear of each of said sets to one of said shafts, a fluid pressure controlled braking device and a source of pressure, of a selecting valve for connecting said clutching devices to said source, and a control valve for releasing the pressure on certain of said devices before connecting said braking device to said source.

7. In a power transmission mechanism, the combination with a plurality of shafts, a plurality of sets of intermeshing gears mounted on said shafts, fluid pressure clutching devices for connecting one gear of each of said sets to one of said shafts, a fluid pressure controlled braking device and a source of pressure, of a selecting valve provided with a plurality of relatively movable ports for connecting said clutching devices to said source, and a control valve for releasing the pressure in certain of the ports of said selecting valve before connecting said braking device to said source.

8. In a power transmission mechanism, the combination with a plurality of shafts, a plurality of sets of intermeshing gears mounted on said shafts, fluid pressure clutching devices for connecting one gear of each of said sets to one of said shafts, and a source of pressure, of a selecting valve for connecting two or more of said devices to said source at the same time, and a check valve interposed between one of said devices and said selecting valve for retarding the operation of said device until after certain other of said devices have been operated from the said source of pressure.

9. In a power transmission mechanism, the combination with a plurality of shafts, a plurality of sets of intermeshing gears mounted on said shafts, fluid pressure clutching devices for connecting one gear of each of said sets to one of said shafts, and a source of pressure, of a selecting valve for connecting two or more of said devices to said source at the same time, and a check valve interposed between one of said devices and said selecting valve for restricting the flow of fluid under pressure to said device and for permitting the unrestricted flow of fluid from said device.

10. In a fluid pressure controlled transmission system, the combination with pressure operated devices and a source of fluid pressure, of a cylinder having a yieldable spring pressed piston operating therein for storing energy in said system and returning it to said system upon the operation of said devices.

11. In a fluid pressure controlled transmission system, the combination with pressure operated devices and a source of fluid pressure, of a pressure accumulating cylinder in said system and means for supplying lubricating fluid to the transmission when the pressure in said cylinder reaches a predetermined point.

12. In a fluid pressure controlled transmission system, the combination with pressure operated devices and a source of fluid pressure, of a pressure accumulating cylinder in said system permanently connected to said pressure operated devices and means connected to said cylinder for supplying lubricating fluid to the transmission when the pressure in the cylinder reaches a predetermined point.

Dated this 27th day of October, 1919.

ARTHUR O. HIGINBOTHAM.

Witnesses:
 NELLIE WHALEN,
 PENELOPE COMBERBACH.